(12) United States Patent
Laughton (10) Patent No.: US 8,930,601 B2
(45) Date of Patent: Jan. 6, 2015

(54) TRANSACTION ROUTING DEVICE AND METHOD FOR ROUTING TRANSACTIONS IN AN INTEGRATED CIRCUIT

(75) Inventor: Arthur Laughton, Hope Valley (GB)

(73) Assignee: ARM Limited, Cambridge (GB)

( * ) Notice: Subject to any disclaimer, the term of this patent is extended or adjusted under 35 U.S.C. 154(b) by 303 days.

(21) Appl. No.: 13/405,549

(22) Filed: Feb. 27, 2012

(65) Prior Publication Data

US 2013/0227186 A1 Aug. 29, 2013

(51) Int. Cl.
*G06F 13/36* (2006.01)
*G06F 13/362* (2006.01)
*G06F 13/00* (2006.01)
*G06F 12/00* (2006.01)
*G06F 13/14* (2006.01)
*G06F 13/38* (2006.01)

(52) U.S. Cl.
USPC ............. 710/113; 710/41; 710/116; 710/240; 710/241; 710/244

(58) Field of Classification Search
CPC ....... G06F 13/26; G06F 13/18; G06F 13/364; G06F 9/52; G06F 12/0669; G06F 13/362; G06F 13/36; G06F 13/4031; G06F 13/1605; G06F 13/374; G06F 13/14; G06F 9/5016
USPC .................. 710/41, 113, 116, 240, 241, 244
See application file for complete search history.

(56) References Cited

U.S. PATENT DOCUMENTS

| | | | | |
|---|---|---|---|---|
| 5,109,512 A | * | 4/1992 | Bahr et al. | 718/103 |
| 5,790,862 A | * | 8/1998 | Tanaka et al. | 717/159 |
| 6,088,751 A | * | 7/2000 | Jaramillo | 710/116 |
| 6,185,221 B1 | * | 2/2001 | Aybay | 370/412 |
| 6,591,107 B1 | * | 7/2003 | Sonetaka | 455/450 |
| 6,665,760 B1 | * | 12/2003 | Dotson | 710/240 |
| 6,671,784 B2 | * | 12/2003 | Lee | 711/151 |
| 6,718,330 B1 | * | 4/2004 | Zenner | 707/694 |
| 8,151,008 B2 | * | 4/2012 | Simon et al. | 710/6 |

(Continued)

FOREIGN PATENT DOCUMENTS

| | | | | | |
|---|---|---|---|---|---|
| AU | 2002235048 B2 | * | 12/2004 | ............. | G06F 12/00 |
| WO | WO 0144944 A3 | * | 3/2002 | ............. | G06F 12/00 |
| WO | WO 2007138664 A1 | * | 12/2007 | ............. | H04J 11/00 |

OTHER PUBLICATIONS

"NB85036038: Programming Arrangement to Set Priorities Among Devices", Mar. 1, 1985, IBM, IBM Technical Disclosure Bulletin, vol. 27, Iss. 10B, p. 6038.*

(Continued)

*Primary Examiner* — Faisal M Zaman
(74) *Attorney, Agent, or Firm* — Nixon & Vanderhye P.C.

(57) ABSTRACT

A transaction routing device (e.g. an interconnect) for routing transactions in an integrated circuit includes arbitration circuitry for performing arbitration between a plurality of candidate transactions using attribute values associated with the candidate transactions. Candidate transactions are selected for routing to a destination device in dependence on the arbitration. In a cycle in which a new candidate transaction is received, the arbitration is performed using a default attribute value as the attribute value for the new transaction. Meanwhile, the actual attribute value is stored to an attribute storage unit. In a following processing cycle, if the new candidate transaction has not yet been selected for muting, then the arbitration is performed using the actual attribute value stored in the storage unit.

18 Claims, 6 Drawing Sheets

(56) References Cited

U.S. PATENT DOCUMENTS

| | | | |
|---|---|---|---|
| 8,499,135 B2* | 7/2013 | Ebisuzaki | 711/168 |
| 2003/0033461 A1* | 2/2003 | Malik et al. | 710/107 |
| 2003/0149598 A1* | 8/2003 | Santoso et al. | 705/2 |
| 2004/0170181 A1* | 9/2004 | Bogdon et al. | 370/400 |
| 2005/0015504 A1* | 1/2005 | Dorne et al. | 709/229 |
| 2005/0175027 A1* | 8/2005 | Miller et al. | 370/458 |
| 2006/0069838 A1* | 3/2006 | Cabot et al. | 710/309 |
| 2006/0140384 A1* | 6/2006 | Plunkett et al. | 379/221.02 |
| 2006/0146934 A1* | 7/2006 | Caglar et al. | 375/240.12 |
| 2007/0133665 A1* | 6/2007 | Litwin | 375/219 |
| 2007/0266168 A1* | 11/2007 | Sampat et al. | 709/231 |
| 2009/0100433 A1* | 4/2009 | Kang et al. | 718/103 |
| 2009/0222875 A1* | 9/2009 | Cheng et al. | 725/147 |
| 2009/0265352 A1* | 10/2009 | Holenstein et al. | 707/8 |
| 2010/0115167 A1* | 5/2010 | Tardieux et al. | 710/240 |
| 2012/0063402 A1* | 3/2012 | Arvidsson et al. | 370/329 |
| 2012/0077488 A1* | 3/2012 | Unger et al. | 455/432.1 |
| 2012/0290755 A1* | 11/2012 | Chachad et al. | 710/244 |
| 2013/0268310 A1* | 10/2013 | Wilson | 705/7.16 |

OTHER PUBLICATIONS

Cena et al., "A Multistage Hierarchical Distributed Arbitration Technique for Priority-Based Real-Time Communication Systems", *IEEE Transactions on Industrial Electronics*, Dec. 2002, vol. 49, No. 6, pp. 1227-1239.

Shah et al., "Priority division: A high-speed shared-memory bus arbitration with bounded legacy", 2011, 4 pages.

Siyoum et al., "Resource-Efficient Real-Time Scheduling Using Credit-Controlled Static-Priority Arbitration", No date, 10 pages.

* cited by examiner

TRANSACTION ROUTING DEVICE AND METHOD FOR ROUTING TRANSACTIONS IN AN INTEGRATED CIRCUIT

BACKGROUND TO THE INVENTION

1. Field of the Invention

The present invention relates to the field of integrated circuits. More particularly, the invention relates to routing transactions in an integrated circuit and arbitrating between the transactions.

2. Background to the Invention

A transaction routing device, such as an interconnect, may be provided in an integrated circuit for routing transactions across the circuit. The transactions may for example comprise read transactions or write transactions. A master device may issue a transaction to the interconnect and the interconnect may route the transaction to a target slave device. When multiple transactions are to be routed to the same destination device, the interconnect may arbitrate between the candidate transactions using attribute values associated with the transaction. However, the arbitration may affect signal timings within the interconnect, and efforts to ensure that the arbitration meets timing requirements can lead to slower performance (if the clock frequency is reduced) or increased power consumption (if the operating voltage is increased). The present technique seeks to provide an improved technique for implementing arbitration in a transaction routing device.

SUMMARY OF THE INVENTION

Viewed from one aspect, the present invention provides a transaction routing device for routing transactions in an integrated circuit, each transaction having an associated attribute value defining an attribute of the transaction, said transaction routing device comprising:

arbitration circuitry configured to perform arbitration between a plurality of candidate transactions using the attribute values associated with said plurality of candidate transactions; and selection circuitry configured to select, in dependence on said arbitration performed by said arbitration circuitry, which of said plurality of candidate transactions to route to a destination device; wherein:

in a processing cycle in which a new candidate transaction is received, said arbitration circuitry is configured to perform said arbitration using a default attribute value as the attribute value for said new candidate transaction, and said transaction routing device is configured to store an actual attribute value associated with said new candidate transaction in an attribute storage element; and in a following processing cycle, if said selection circuitry has not yet selected said new candidate transaction for routing to said destination device, then said arbitration circuitry is configured to perform said arbitration using said actual attribute value stored in said attribute storage element as the attribute value for said new candidate transaction.

When arbitrating between a plurality of candidate transactions based on attribute values associated with the candidate transactions, the critical timing path is often the path taken by the attribute value through the arbitration circuitry rather than the path taken by the candidate transaction itself. For example, if the clock frequency is high enough or operating voltage is low enough, then while a new transaction may be able to be received and be selected for routing to a destination device in a single processing cycle, the arbitration circuitry may not have time to capture the actual attribute value of the transaction and use that value for arbitration within the same cycle. Hence, the arbitration may place constraints on the operating frequency and operating voltage which can be supported by the transaction routing device.

A possible solution to this problem is to provide a storage element, such as a register or flip-flop, for buffering the entire transaction for a cycle so that the transaction is received in one cycle and the arbitration is performed in the next cycle using the actual attribute value captured in the previous cycle. However, this approach tends to reduce performance since a newly received transaction must wait two cycles before it can undergo arbitration. Also, providing a storage element for buffering the entire transaction is expensive in terms of power consumption and area.

To address this problem, the present technique recognises that it is not necessary for the arbitration circuitry to use the actual attribute value for a new candidate transaction in the cycle in which the new candidate transaction is received. Instead, a default attribute value, which is not necessarily the same as the actual attribute value, can be used for the new candidate transaction in the first processing cycle. This enables the arbitration circuitry to begin arbitration based on the default value before the actual attribute value has been captured, so that the new transaction has the opportunity to be selected in the cycle in which it is received even if result of arbitration based on the actual attribute value would not be available in time.

Meanwhile, the actual attribute value associated with the new transaction at cycle is stored to an attribute storage element. In a following cycle, if the new candidate transaction has not yet been selected for routing to the destination device, then the actual attribute value stored in the attribute storage element is used as the attribute value for arbitrating the new candidate transaction. By storing just the attribute value of an incoming candidate transaction, and not the entire candidate transaction, the power consumption and area of the circuit can be greatly reduced, since typically the attribute value comprises many fewer bits than the entire transaction (for example, typical transactions may comprise over 100 bits, while the attribute value may only comprise 4 or 8 bits of the transaction).

It may seem counterintuitive that it is acceptable to perform arbitration using a default attribute value instead of the actual attribute value for a new candidate transaction. For example, in some instances it is possible that the default value leads to the new candidate transaction not being selected for routing to the destination device, whereas arbitration based on the actual attribute value would have caused the new transaction to be selected. However, the present technique recognises that in this situation, the penalty for not selecting the transaction is merely a delay while the new transaction waits for the actual attribute value to be available, which is the same delay as would occur if the arbitration circuitry waited for the actual attribute value to become available before performing any arbitration for the new transaction. Therefore, the use of a default attribute value instead of the actual attribute value does not incur any real performance penalty.

The present technique also provides an improved performance in the case where the new candidate transaction does not contend with any other transactions at the point of arbitration. Sometimes, there may only be one candidate transaction awaiting routing via the interconnect or awaiting routing to a particular destination device. With the alternative approach of buffering the entire transaction for an extra cycle in order to accommodate arbitration using the actual attribute value, the new transaction would be delayed unnecessarily as the actual attribute value is not needed when there is no contention with another transaction. In contrast, the present technique of arbitrating based on a default value allows the new transaction to be selected for routing to the destination device in the same cycle the transaction is received when there is no contention, without the need to wait for the actual attribute value.

The arbitration may be such that the arbitration circuitry controls the selection circuitry to select a candidate transaction associated with an attribute value other than the default attribute value with a greater probability than a candidate transaction associated with the default attribute value. That is, the default attribute value may be an attribute value which less favoured during the arbitration. This means that during the processing cycle in which a new candidate transaction is received, the arbitration will tend to favour older transactions whose actual attribute value is being used. This can help to reduce the likelihood that an older transaction will remain pending indefinitely. Nevertheless, the default value still allows the new transaction to progress when there is no contention or when there are no other transactions with an attribute value other than the default value.

The transaction routing device may comprise a plurality of transaction paths for handling the plurality of candidate transactions. When a candidate transaction from one of the transaction paths is selected by the selection circuitry for routing to the destination device, then another candidate transaction may be received on that transaction path in the following cycle.

Each transaction path may have an associated attribute storage element for storing the attribute value associated with the candidate transaction handled by the transaction path, and the arbitration circuitry may perform the arbitration using the attribute values stored in the respective attribute storage elements of the plurality of transaction paths. This provides a simple way of tracking the attribute values to be used for arbitration.

There are various ways of ensuring that the default attribute value is used in the first cycle in which a new candidate transaction is received. For example, the arbitration circuitry may receive a signal indicating that a predetermined default value should be used for a particular transaction in a given cycle, thus overriding the value stored in the corresponding attribute storage element.

However, a simple and efficient way of ensuring that the default attribute value is used for a new candidate transaction is to store the default value in the attribute storage element for the transaction path that receives the new candidate transaction. When the selection circuitry selects a candidate transaction from a selected transaction path for routing to the destination device, the attribute storage element of the selected transaction path may be reset to the default attribute value. This means that when another candidate transaction is received on the same transaction path, the arbitration circuitry may begin the arbitration using the default value stored in the attribute storage element of that transaction path. Meanwhile, the actual attribute value of the new candidate transaction is written to the attribute storage element to overwrite the default attribute value during the cycle in which the candidate transaction is received. In this way, the arbiter uses a default value for the cycle in which a new transaction is received, and uses the actual attribute value for subsequent cycles until the candidate transaction has been selected.

The attribute value may be a value that accompanies the associated transaction as it is routed by the transaction routing device. The transaction may comprise a given number of bits, and a subset of those bits may specify the attribute value. The remaining bits of the transaction may be used for specifying other parameters, such as a target address identifying a memory location to which data is to be written or from which data is to be read.

When a selected candidate transaction is selected by the selection circuitry and routed to the destination device, the selected candidate transaction may be accompanied by the actual attribute value irrespective of whether the actual value or the default value was used by the arbitration circuitry for the selected transaction when performing arbitration. Hence, the attribute value which is associated with the transaction remains the same regardless of which value is used for arbitration. Even when the default value is used for the purpose of arbitration, the actual attribute value still accompanies the transaction when the transaction is routed to the destination device.

The arbitration may include a comparison of the attribute values associated with the plurality of candidate transactions. By comparing attribute values, the arbiter can determine which transaction should be selected for routing to the destination device.

The arbitration may also include other operations, such as determining whether a candidate transaction meets at least one criterion for being selected by the selection circuitry. The arbitration circuitry may then control the selection circuitry to prevent a candidate transaction which does not meet the at least one criterion being selected for routing to the destination device.

The at least one criterion may include, for example, whether or not the attribute value associated with the candidate transaction is a member of a set of one or more target values, or whether the attribute value associated with the candidate transaction is greater than or less than a threshold value.

In one example, the attribute value may be a priority value defining a priority level of the associated transaction, and the arbitration circuitry may control the selection circuitry to select a candidate transaction having high priority level with a greater probability than a candidate transaction having a low priority level. Hence, the transactions can be provided with priority values indicating the relative significance of the transaction.

While the default priority value could be any priority level, it is generally safest for the default priority value to correspond to the lowest possible priority level. In this way, a newly received transaction will not prevent a higher priority transaction from being selected during the first cycle in which the new transaction is received. If it turns out that the new transaction is actually a high priority transaction, then in a subsequent cycle the new transaction will be favoured over lower priority transactions.

Alternatively, or in addition to the priority value, the attribute value may define a transaction type of the associated transaction. For example, the transaction type may indicate whether the transaction is a coherent or non-coherent transaction, whether the transaction is a device-type transaction, and so on. The default attribute value may for example indicate a default transaction type which is less favoured in comparison to other transaction types, so that during the cycle in which a new transaction is received, the arbitration circuitry assumes that the transaction is of the default type, to allow a candidate transaction of another type to proceed.

The attribute value may also be a value which identifies a source device which issued the associated transaction and/or the destination device to which the associated transaction is to be routed. Hence, the arbiter may make routing decisions based on the source on destination device.

The transaction routing device may be an interconnect for an integrated circuit.

Viewed from another aspect, the present invention provides an integrated circuit comprising the transaction routing device.

Viewed from a further aspect, the present invention provides a transaction routing device for routing transactions in an integrated circuit, each transaction having an associated attribute value defining an attribute of the transaction, said transaction routing device comprising:

arbitration means for performing arbitration between a plurality of candidate transactions using the attribute values associated with said plurality of candidate transactions; and selection means for selecting, in dependence on said arbitration performed by said arbitration means, which of said plurality of candidate transactions to route to a destination device; wherein:

in a processing cycle in which a new candidate transaction is received, said arbitration means is configured to perform said arbitration using a default attribute value as the attribute value for said new candidate transaction, and said transaction routing device is configured to store an actual attribute value associated with said new candidate transaction in an attribute storage means for storing an attribute value; and in a following processing cycle, if said selection means has not yet selected said new candidate transaction for routing to said destination device, then said arbitration means is configured to perform said arbitration using said actual attribute value stored in said attribute storage means as the attribute value for said new candidate transaction.

Viewed from another aspect, the present invention provides a method for routing transactions in an integrated circuit, each transaction having an associated attribute value defining an attribute of the transaction, said method comprising:

an arbitration step of performing arbitration between a plurality of candidate transactions using the attribute values of said plurality of candidate transactions; and a selecting step of selecting, in dependence on said arbitration, which of said plurality of candidate transactions to route to a destination device; wherein:

in a processing cycle in which a new candidate transaction is received, said arbitration is performed using a default attribute value as the attribute value for said new candidate transaction, and an actual attribute value associated with said new candidate transaction is stored in an attribute storage element; and in a following processing cycle, if said new candidate transaction has not yet been selected for routing to said destination device, then said arbitration is performed using said actual attribute value stored in said attribute storage element as the attribute value for said new candidate transaction.

Further particular and preferred aspects of the present invention are set out in the accompanying independent and dependent claims. Features of the dependent claims may be combined with features of the independent claims as appropriate, and in combinations other than those explicitly set out in the claims.

The above, and other objects, features and advantages of this invention will be apparent from the following detailed description of illustrative embodiments which is to be read in connection with the accompanying drawings.

DESCRIPTION OF THE EMBODIMENTS

Figure 1:
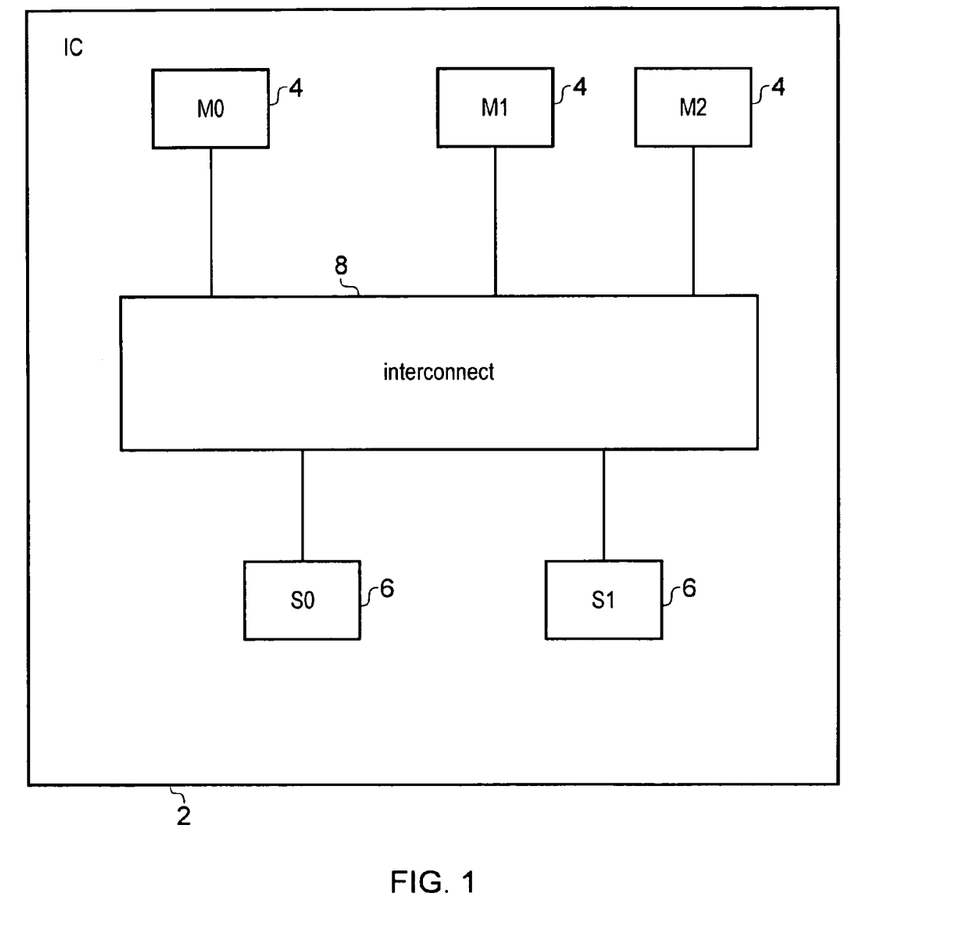
FIG. 1 schematically illustrates an integrated circuit comprising an interconnect.

FIG. 1 schematically illustrates an integrated circuit 2 comprising master devices 4 and slave devices 6 connected via an interconnect 8. The interconnect 8 is an example of a transaction routing device. A master device 4 can issue write or read transactions to a slave device 6 via the interconnect 8. The interconnect 8 routes the transactions to the appropriate slave device 6.

The master devices 4 may for example include a processor, a co-processor, a direct memory access controller, and a graphics processing unit. The slave devices 6 may for example include a memory or an input/output device. While FIG. 1 illustrates the master devices 4 and slave devices 6 as separate devices, some devices may be able to function as both a master device and a slave device. For example, a co-processor may act as a slave device when receiving transactions from a main processor, but act as a master device when issuing transactions to memory.

Figure 2:
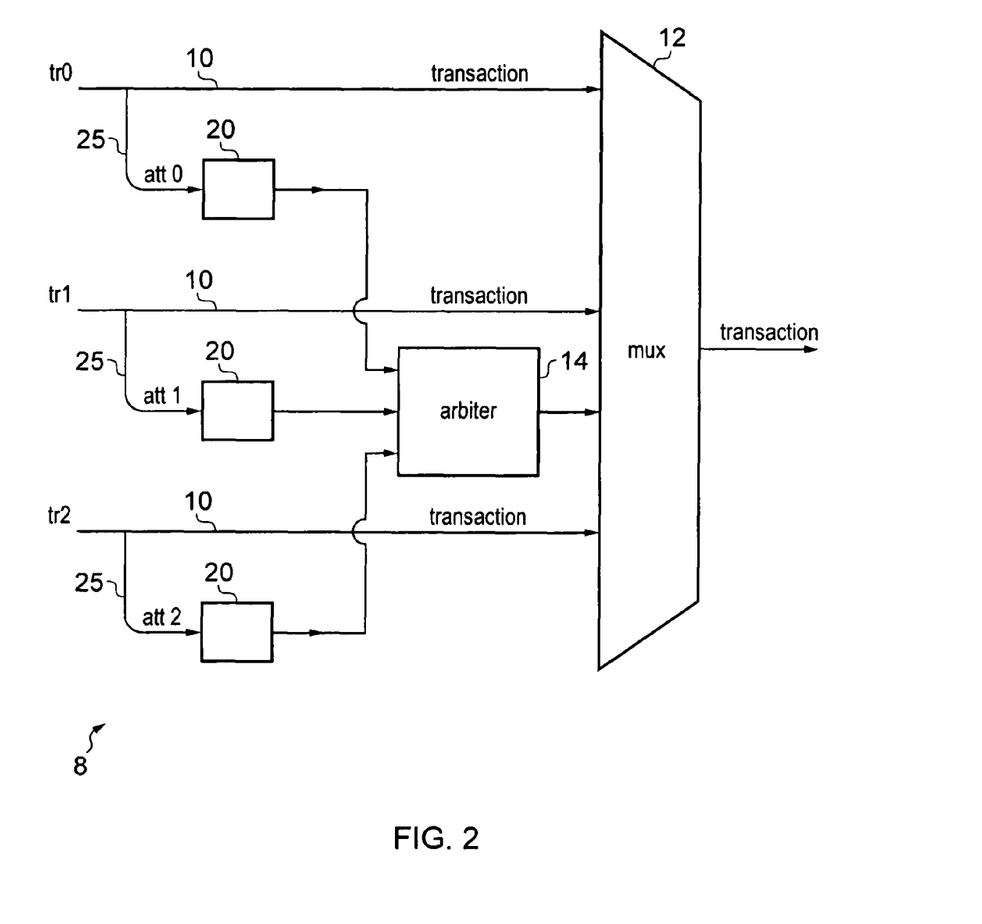
FIG. 2 schematically illustrates a portion of the interconnect including an arbiter for arbitrating between candidate transactions and a selector for selecting which candidate transactions to route to a destination device.

In cycles when more transactions targeting the same slave device 6 are pending than can be routed to the slave device 6 in the same cycle, the interconnect 8 may perform arbitration to select which of the transactions should be routed to the destination slave 6 in that cycle. FIG. 2 shows a portion of the interconnect 8 including circuitry for performing the arbitration. The interconnect 8 includes several transaction paths 10 for receiving candidate transactions to be routed to a destination slave device 6. When a master device 4 wishes to issue a transaction, then it issues a transaction to the interconnect 8 and the interconnect 8 receives the transaction on one of the transaction paths 10. A multiplexer 12 is provided to select which of the candidate transactions should be routed to the slave device 6. If transactions are pending on more than one transaction path 10 in the same cycle, then an arbiter 14 performs arbitration based on attributes of the pending transactions. The arbiter 14 determines which transaction should be selected and controls the multiplexer 12 to select the appropriate transaction.

While FIG. 2 shows an example of a 3:1 multiplexer 12 for selecting one of three candidate transactions for routing to the destination device, the present technique may also be applied to other kinds of multiplexers or selection devices, including devices which select multiple transactions to route to devices within the same cycle (for example a 3:2 multiplexer).

As shown in FIG. 2, each transaction path 10 has an associated attribute storage element 20 for storing an attribute value of the transaction received on that transaction path. Each attribute storage element 20 may for example comprise a register, a flip-flop or a latch. The attribute storage elements 20 are clocked so that the attribute value stored to the attribute storage element in one processing cycle is available to the arbiter for arbitration during the following processing cycle.

The arbiter 14 arbitrates between the candidate transactions on the transaction path 10 based on the attribute value stored in the attribute storage unit 20. For example, the arbitrator 14 may compare the attribute values of the different candidate transactions and may also check whether the attribute values meet one or more selection criteria which a transaction must satisfy in order to be routed to a destination device. For example, the attribute value may need to be higher than a given threshold or may need to be a member of a set of one or more allowable attribute values. These arbitration operations can take some time and so typically the signal path taken by the attribute value through the arbiter 14 is the critical path whose timing determines the highest clock frequency and/or lowest operating voltage at which the interconnect can operate.

If the attribute storage elements 20 were not provided, then within a single clock cycle the actual attribute value of an incoming transaction which is received for the first time by the transaction path 10 would need to be captured and used by the arbiter 14. If the clock period is not sufficient for the arbitration to be completed in a single cycle, then without the present technique either the frequency would need to be reduced (which would slow the performance of the integrated circuit 2), the operating voltage increased (increasing power consumption) or the transaction 10 buffered for an additional clock cycle while the arbitration is performed (which would be expensive in terms of area and power consumption).

In contrast, in the present technique attribute storage elements 20 are provided to divide the path 25 taken by the attribute value through the arbiter 24. This means that the time required for arbitrating based on a new attribute value can be spread over at least two clock cycles and hence a higher clock frequency or lower operating voltage can be used. However, the transaction paths 10 which convey the transactions are not divided by a storage element, and so the transactions themselves can still traverse the transaction paths 10 within a single cycle, enabling a transaction to be selected by the multiplexer 12 in the same cycle in which it is received. During a cycle in which the actual attribute value of a new transaction is not ready for arbitration, a default attribute value is used for that transaction by the arbiter 14. In this way, the delay associated with the storage elements 20 on the attribute signal path 25 does not prevent the transaction traversing the transaction path 10 within a single cycle. Arbitration in subsequent cycles can use the actual attribute value, because by this point the actual attribute value has been written to the storage element 20.

There are various ways in which the arbiter 14 may be controlled to use a default attribute value for a new candidate transaction. For example, the arbiter 14 may maintain a flag for each transaction. If the flag corresponding to a given transaction has a first value, then the arbiter 14 may use the default attribute value for that transaction, while if the flag has a second value, then the arbiter 14 may use the actual attribute value stored in the corresponding storage element 20. The flag may be set to the first value when a transaction is selected by the multiplexer 12, so that when a new transaction is received the default value is used for the first cycle. The flag may then be set to the second value if the new transaction is not selected in the first cycle, to indicate that the actual attribute value should be used in subsequent cycles.

However, an efficient way of ensuring that the default value is used at first for a new transaction is for the arbiter 14 or selection circuitry 12 to reset the attribute value storage element 20 to the default attribute value when the corresponding transaction is selected for routing to the destination device. This means that when a new candidate transaction is received on the same transaction path 10 then the arbiter 14 will initially use the default attribute value in the attribute storage element 20. Meanwhile, the default value in the attribute value store 20 is overwritten with the actual attribute value, and so the actual value is used by the arbiter 14 for following processing cycles if the new transaction has not yet been selected by the multiplexer 12.

Figure 3:
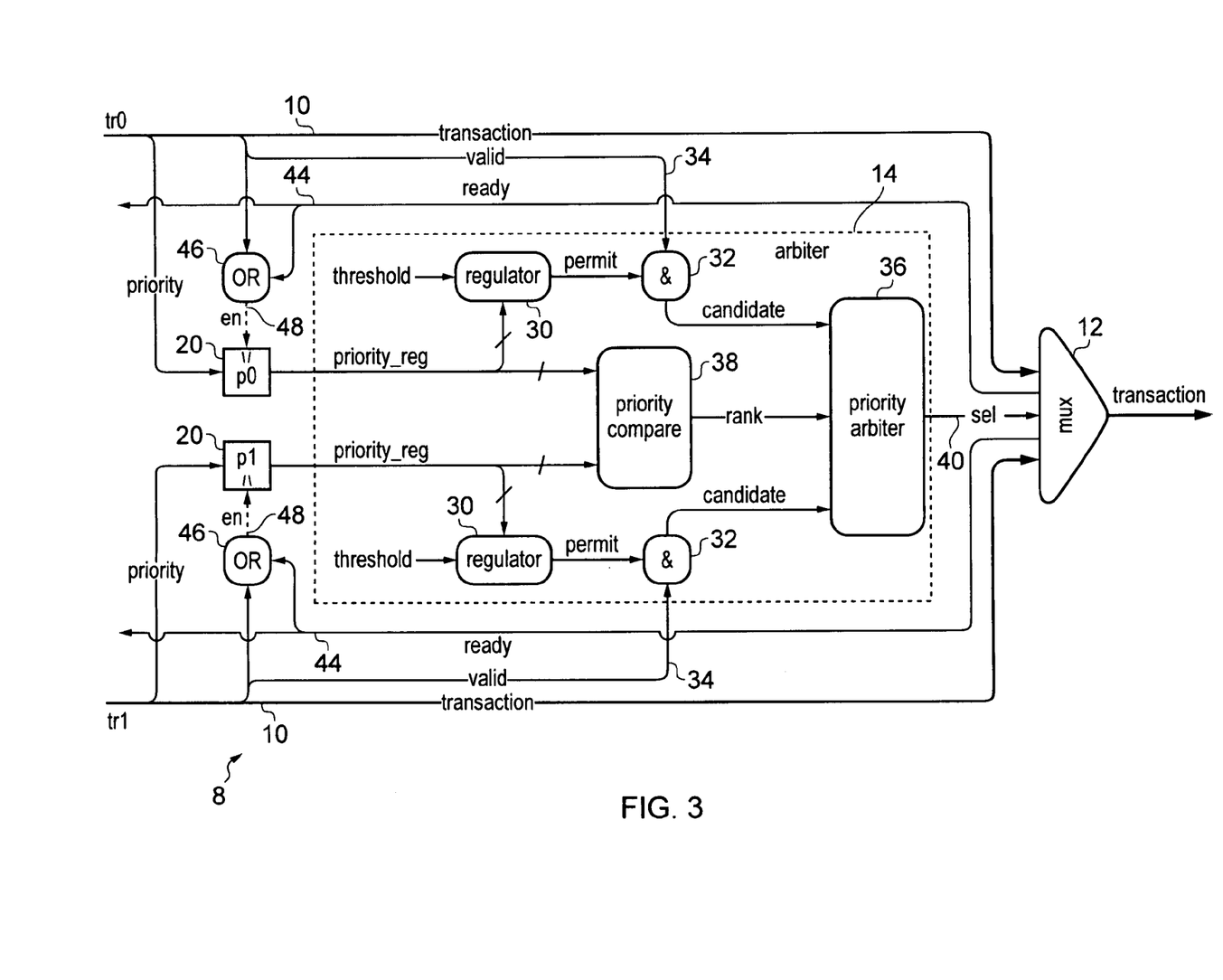
FIG. 3 illustrates an example of a portion of the interconnect for arbitrating between transactions based on priority values associated with the transactions.

FIG. 3 shows another example of the arbitration and selection logic of the interconnect 8. For conciseness, the example of FIG. 3 shows a 2:1 multiplexer, but again the technique can also be applied to other kinds of multiplexers (e.g. 3:1, 3:2, 4:1, etc.).

In the example of FIG. 3, the attribute value is a priority value specifying a priority level of the transaction. The arbitration includes comparing the priority values of different candidate transactions to check which transaction has the highest priority level. Generally, a transaction with a higher priority level is selected in preference to a transaction with a lower priority level. If two or more candidate transactions have equal priority levels than another selection criterion may be used, for example which transaction path 10 has been selected least recently.

It will be appreciated that there are different schemes for representing the priority level as a numeric priority value. In one example, the smallest priority value may indicate the highest priority level and the largest priority value may indicate the lowest priority level (i.e. a transaction with priority value 0 is selected in preference to a transaction with priority value 3), while another embodiments the mapping may be the other way round so that a transaction with a higher priority value is selected in preference to a transaction with a lower priority value. Therefore, the terms "higher" or "lower" priority level do not imply that the priority values used to represent the priority levels are higher or lower.

The priority value of a given transaction may be subject to certain selection criteria other than the comparison with priority values of other transactions. In the example of FIG. 3, the arbitration also includes checking whether the priority level exceeds a given threshold, with transactions whose priority level is lower than the threshold being prevented from being selected for routing to a destination device. This can be useful if the destination device only has limited resources (e.g. buffer space or bandwidth) for handling incoming transactions. At times when resources at the destination device are scarce, then the destination device can signal to the interconnect 8 that the threshold should be increased so that only the transactions with priority levels higher than the threshold are candidates for arbitration by the arbiter 14, thus making more efficient use of the limited resources available. On the other hand, when more resources become available at the destination device, then the threshold may be lowered to allow a greater number of lower priority transactions to be selected.

As in FIG. 2, the interconnect 8 illustrated in FIG. 3 also includes multiple transaction paths 10 for receiving pending transactions, a multiplexer 12 for selecting which transactions to route to the destination device, an arbiter 14 for arbitrating between the transactions, and attribute storage elements 20 for storing the attribute values of the transactions. The arbiter 14 includes a priority regulator 30 and AND gate 32 for each transaction path 10, a priority arbiter 36 and a priority comparator 38.

In a cycle in which a new transaction is received on one of the transaction paths 10, the new transaction is sent directly to the multiplexer 12 where it may potentially be selected for routing to the destination device. Meanwhile, during that cycle the arbiter 14 performs arbitration using a default priority value stored in the attribute store element 20 corresponding to that transaction path 10, and the actual priority value of the incoming transaction is stored to the attribute store element 20 for use in subsequent cycles. The default priority value is the value indicating the lowest priority level, so that in the cycle a new transaction is received, a higher priority transaction on the other transaction path 10 will be selected ahead of the new transaction.

During the arbitration, the priority regulator 30 of each transaction path 10 checks whether the corresponding priority level of the corresponding transaction (whether the default priority for a new transaction or the actual priority for a later transaction) meets a threshold criterion. For example, the criterion may be that the priority level is greater than or equal to a threshold level, or that the priority level is greater than a threshold level. Each priority regulator 30 outputs a signal indicating whether the criterion is satisfied. An AND gate 32 receives the signal from the priority regulator 30 and also receives a valid signal 34 which indicates whether there is a valid transaction on the corresponding transaction path 10 (in cycles when no transaction is pending for a given transaction path 10, the valid signal is deasserted to indicating that there is no valid transaction). The AND gate 32 outputs a candidate signal to the priority arbiter 36 indicating whether the transaction on the transaction path 10 is a candidate for arbitration. The transaction is a candidate for arbitration if the valid signal 34 indicates a valid transaction and the priority regulator 30 signals that the priority value associated with the transaction satisfies the threshold criterion.

Meanwhile, the priority comparator 38 of the arbiter 14 compares the priority values (whether default or actual priority values) stored in the storage elements 20 for each transaction path 10, and outputs a ranking signal indicating which transaction path conveys the transaction with the highest priority level. If multiple transactions have equal priority, then a round robin or a fixed selection scheme may be used to select one of the transactions.

The priority arbiter 36 receives the candidate signals from the respective AND gates 32 and the ranking signal from the priority comparator 38 and issues a selection signal 40 to the multiplexer 12 indicating which transaction should be selected for routing to the destination device. If the candidate signals indicate that only one transaction is a candidate for arbitration, then that candidate transaction is selected, while if more than one transaction is a candidate, then the transaction indicated by the ranking signal from the priority comparator 38 is selected.

The multiplexer 12 routes the transaction indicated by the selection signal 40 to a downstream device (the routing may be direct to the downstream device or indirect via an intermediate device such as another interconnect). When the transaction is selected for routing, the multiplexer 12 also sends a ready signal 44 to the attribute storage element 20 associated with that transaction, indicating that the storage element 20 should be reset to the default priority value. This ensures that when another transaction is received on the same transaction path then the arbiter 14 uses the default priority value for that transaction in the first cycle in which the transaction is received.

Each storage element 20 is associated with an OR gate 46 which receives both the ready signal 44 and the valid signal 34 of the transaction on the corresponding transaction path 10, and generates an enable signal 48 for the attribute storage element 20 if either of the ready signal 44 and valid signal 34 is asserted. The attribute storage element 20 is written only when the enable signal 48 is asserted. This means that the attribute storage element 20 can only be written when either a valid transaction is received (in which case the actual attribute value is written to the storage element 20 for use by the arbiter 14 in the following cycle) or when a transaction has been selected by the multiplexer and the ready signal 44 indicates that the storage element 20 should be reset to the default priority value.

Figure 4:
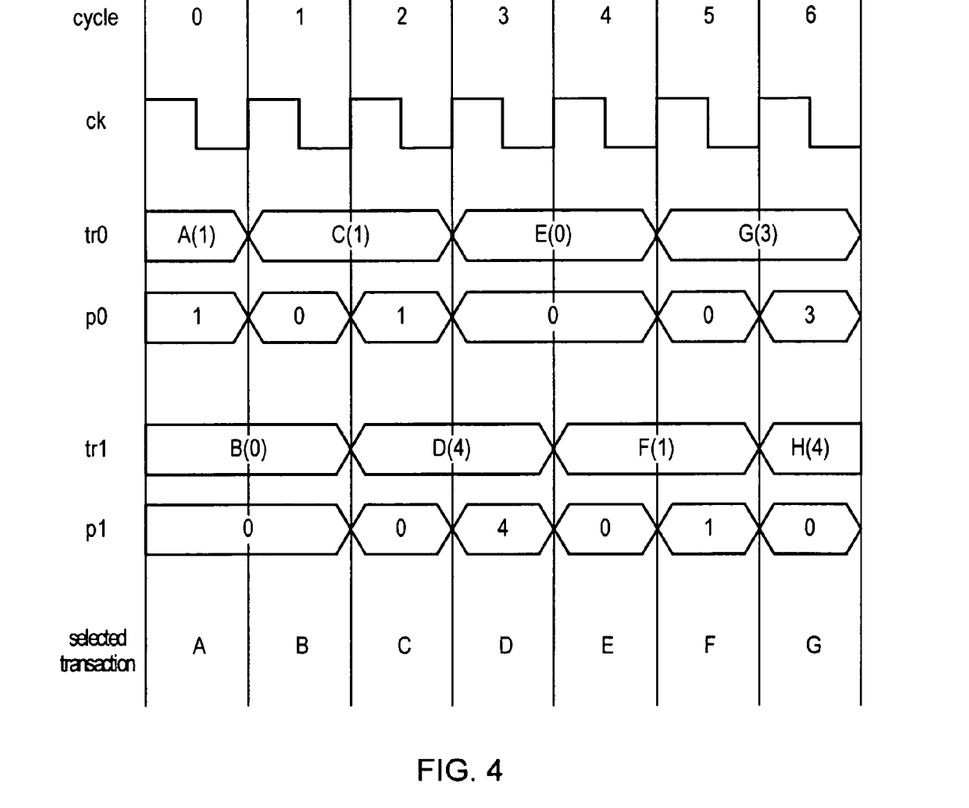
FIG. 4 is a timing diagram illustrating a first example of arbitration.

FIG. 4 shows a first timing diagram showing an example of the operation of the circuit of FIG. 3. In this example, higher priority values are used to indicate higher priority levels, but it will be appreciated that the opposite relationship between priority values and priority levels may also be used.

In cycle 0, a transaction A is pending on the first transaction path tr0 and has a priority value of 1, and a transaction B is pending on the second transaction path tr1 and has a priority value of 0. Hence, during the cycle 0 the arbiter 14 and multiplexer 12 select the transaction A on the first transaction path tr0 for routing to the destination device, because transaction A has the higher priority level. As the transaction on transaction path tr0 has been selected for routing, storage element p0 (20) associated with path tr0 is reset to the default priority value of 0.

This means that in cycle 1, when a new transaction C is received on transaction path tr0, the default value 0 is used for arbitration even though the actual priority value for transaction C is 1. In cycle 1, the priority values are equal for transactions B and C, so the arbiter may select either transaction. In this example, transaction B is selected, because it has been pending for a greater number of cycles than transaction C, although other techniques for resolving the priority tie may be used if desired. Again, the storage element p1 associated with the selected transaction B is reset to the default value 0. Meanwhile, during cycle 1 the actual priority value 1 associated with transaction C is written to the storage element 20 of transaction path tr0, and so in the next cycle 2 the actual priority value 1 is used for transaction C.

Similarly, FIG. 4 shows that in cycles 2 to 6 the priority values are compared in each cycle and the transaction with the higher priority is selected. Each time a transaction enters one of the transaction paths tr0, tr1 then the default value 0 is used for the first cycle because the storage element 24 that transaction path has been reset to a default value when the preceding transaction on that transaction path was selected. For a subsequent cycle, the actual priority value is used.

Figure 5:
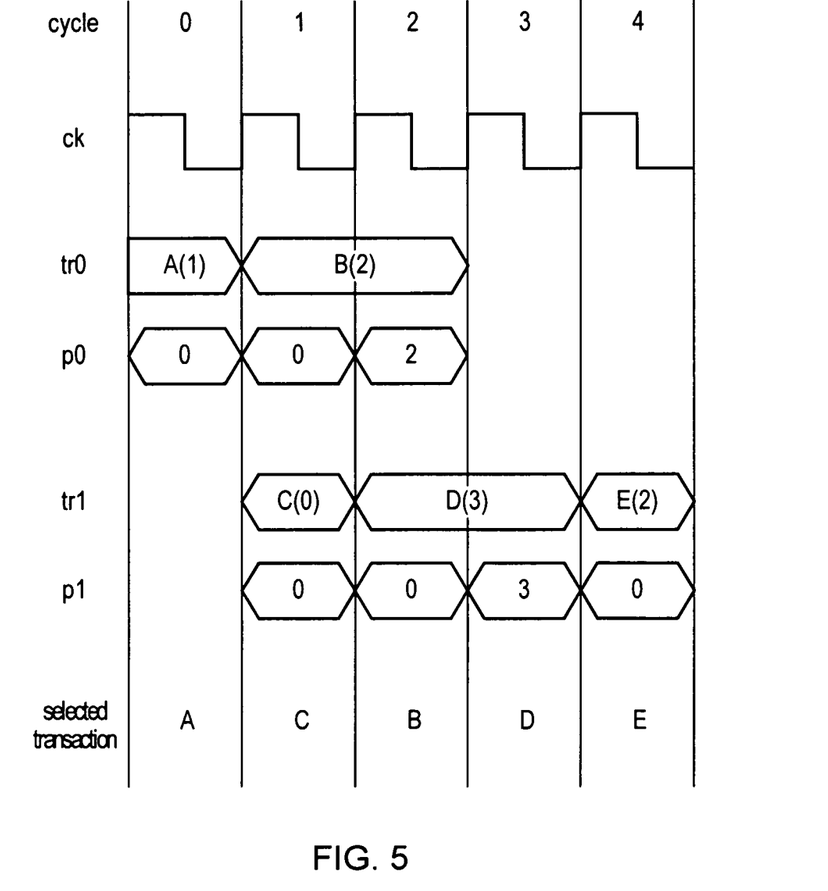
FIG. 5 is a timing diagram showing a second example of arbitration.

FIG. 5 shows another example timing diagram showing the arbitration. In the example of FIG. 5, there are some cycles in which no valid transaction is received on one of the transaction paths 10. In cycle 0, a transaction A having priority value 1 is received on transaction path tr0 but no transaction is received on transaction path tr1. Since this is the cycle in which transaction A has been received, the default priority value 0 is used for arbitration. Since transaction A is the only candidate transaction pending, transaction A is selected. It is in this situation that the present technique is particularly useful. By using a default value for the first cycle as in the present invention, there is no need to delay selection of the transaction while waiting for the actual priority value which would in any case be unnecessary as there is no contention.

In the next cycle 1 of FIG. 5, transactions B and C are received on the two transaction paths tr0, tr1. Since both transactions are received for the first time, both transactions use the default priority value for the first cycle. The arbiter selects one of the transactions (for example transaction C from path tr1 because a transaction from path tr0 was picked in the previous cycle). Again, this shows how a transaction can be selected in the same cycle in which it is received, because there is no need to wait for the actual priority value to become available.

Since the transaction from path tr1 is selected in cycle 1, then the corresponding storage element p1 is reset to the default value 0 for the following cycle. Meanwhile, the actual priority value 2 associated with transaction B is written to the storage element p0 of transaction path 10. Hence, during cycle 2 the arbitration uses priority value 2 for transaction B and the default priority value 0 for a new transaction D (even though the actual priority value for transaction D is 3), and so transaction B is selected in cycle 2. In cycles 3 and 4, no further transactions are received on path tr0, so the transaction on path tr1 is selected for both cycles.

Figure 6:
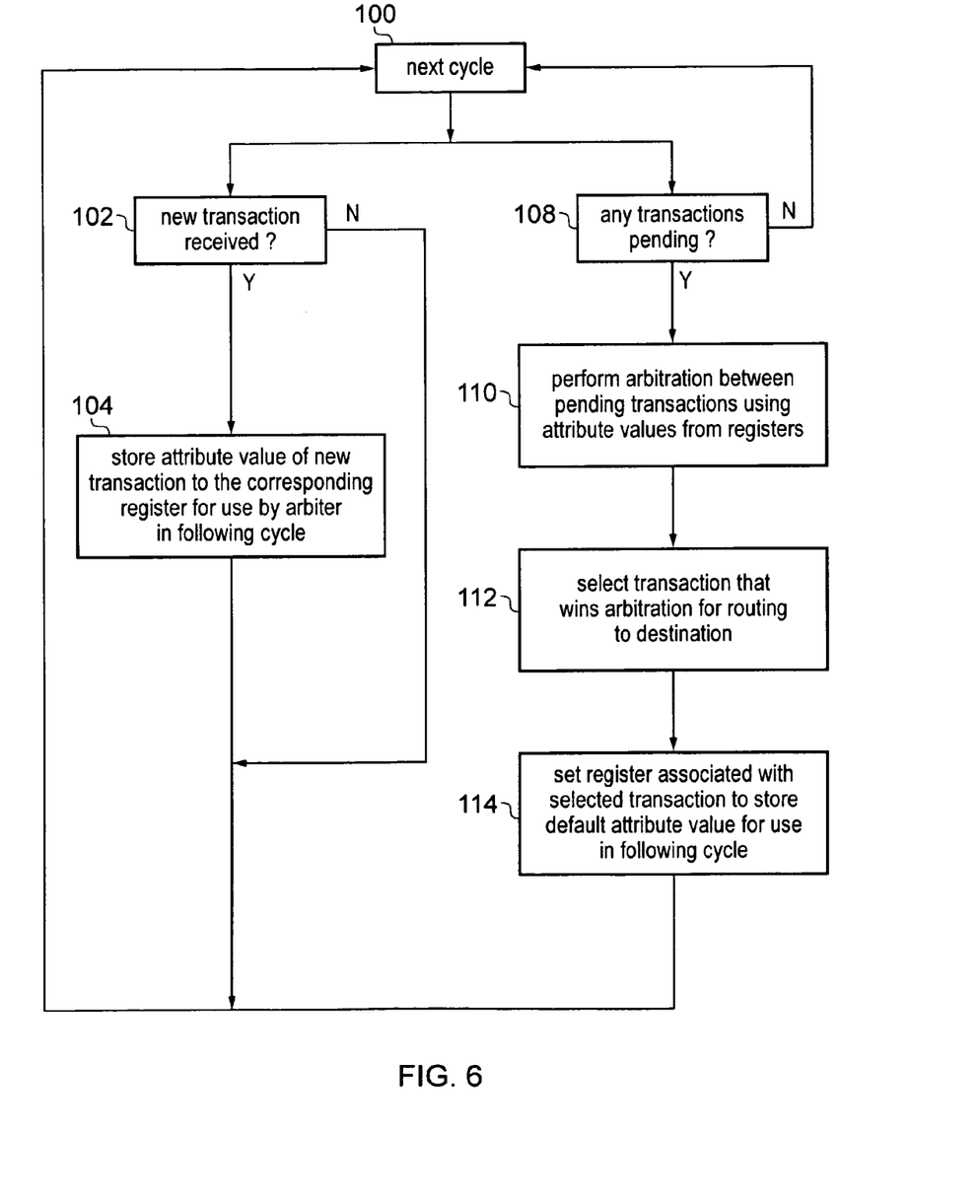
FIG. 6 illustrates a method of routing transactions in an integrated circuit.

FIG. 6 shows a method of routing transactions in an integrated circuit. At step 100 the next clock cycle begins. In parallel, steps 102 and 108 are performed. At step 102 it is determined whether a new transaction is received, and if so then at step 104 the actual attribute value of the new transaction is stored to the corresponding storage element 20 (e.g. a register) for use by the arbiter in the following cycle. If no new transaction has been received then step 104 is omitted and the value in the storage element 20 remains unchanged.

Meanwhile, at step 108 it is determined whether there are any pending transactions. If there are no pending transactions, then the method returns to step 100 to wait for the next cycle. If there is at least one pending transaction, then at step 110 arbitration is performed for any pending candidate transactions using the attribute values stored in the attribute storage elements 20 associated with those transactions. The arbitration at step 110 starts before the attribute value has been stored to the corresponding register in step 104, and so for a newly received transaction a default priority value from the priority register 20 is used for arbitration.

At step 112, the multiplexer 12 is controlled to select the candidate transaction that wins the arbitration. The selected transaction is routed to the destination device. At step 114, the attribute storage element 20 associated with the selected transaction is reset to store a default attribute value for use by the arbiter in the following cycle when a new transaction is received. The method then returns to step 100 for the next cycle.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A transaction routing device for routing transactions in an integrated circuit, each transaction having an associated attribute value defining an attribute of the transaction, said transaction routing device comprising:
    arbitration circuitry configured to perform arbitration between a plurality of candidate transactions using the attribute values associated with said plurality of candidate transactions; and
    selection circuitry configured to select, in dependence on said arbitration performed by said arbitration circuitry, which of said plurality of candidate transactions to route to a destination device; wherein:
    in a processing cycle in which a new candidate transaction is received and the result of arbitration using an actual attribute value of the new candidate transaction is not yet available, said arbitration circuitry is configured to perform said arbitration using a default attribute value as the attribute value for said new candidate transaction, and said transaction routing device is configured to store the actual attribute value associated with said new candidate transaction in an attribute storage element; and
    in a following processing cycle, if said selection circuitry has not yet selected said new candidate transaction for routing to said destination device, then said arbitration circuitry is configured to perform said arbitration using said actual attribute value stored in said attribute storage element as the attribute value for said new candidate transaction.

2. The transaction routing device according to claim 1, wherein said arbitration circuitry is configured to perform said arbitration to control said selection circuitry to select a candidate transaction associated with an attribute value other than said default attribute value with a greater probability than a candidate transaction associated with said default attribute value.

3. The transaction routing device according to claim 1, comprising a plurality of transaction paths for handling said plurality of candidate transactions, each transaction path having an associated attribute storage element for storing the attribute value associated with the candidate transaction handled by the transaction path.

4. The transaction routing device according to claim 3, wherein said arbitration circuitry is configured to perform said arbitration using the attribute values stored in the attribute storage elements of the plurality of transaction paths.

5. The transaction routing device according to claim 3, wherein in response to said selection circuitry selecting a candidate transaction from a selected transaction path for routing to said destination device, said transaction routing device is configured to reset said attribute storage element of said selected transaction path to said default attribute value.

6. The transaction routing device according to claim 1, wherein said attribute value accompanies the associated transaction as it is routed by said transaction routing device.

7. The transaction routing device according to claim 6, wherein when a selected candidate transaction selected by said selection circuitry is routed to said destination device, said selected candidate transaction is accompanied by said actual attribute value irrespective of whether said arbitration circuitry used said actual attribute value or said default attribute value for said selected candidate transaction when performing said arbitration.

8. The transaction routing device according to claim 1, wherein said arbitration includes a comparison of said attribute values associated with said plurality of candidate transactions.

9. The transaction routing device according to claim 1, wherein said arbitration includes determining whether a candidate transaction meets at least one criterion for being selected by said selection circuitry, wherein said arbitration circuitry controls said selection circuitry to prevent a candidate transaction which does not meet said at least one criterion being selected for routing to said destination device.

10. The transaction routing device according to claim 9, wherein said at least one criterion includes at least one of:
    whether or not the attribute value associated with the candidate transaction is a member of a set of one or more target values;
    whether the attribute value associated with the candidate transaction is greater than, equal to or less than a threshold value.

11. The transaction routing device according to claim 1, wherein said attribute value comprises a priority value defining a priority level of the associated transaction, and said arbitration circuitry is configured to control said selection circuitry to select a candidate transaction having a high priority level with a greater probability than a candidate transaction having a low priority level.

12. The transaction routing device according to claim 11, wherein said default attribute value comprises a default priority value corresponding to the lowest possible priority level.

13. The transaction routing device according to claim 1, wherein said attribute value defines a transaction type of the associated transaction.

14. The transaction routing device according to claim 1, wherein said attribute value identifies a source device which issued the associated transaction or said destination device to which the associated transaction is to be routed.

15. The transaction routing device according to claim 1, wherein said transaction routing device is an interconnect for an integrated circuit.

16. An integrated circuit comprising the transaction routing device according to claim 1.

17. A transaction routing device for routing transactions in an integrated circuit, each transaction having an associated attribute value defining an attribute of the transaction, said transaction routing device comprising:
   arbitration means for performing arbitration between a plurality of candidate transactions using the attribute values associated with said plurality of candidate transactions; and
   selection means for selecting, in dependence on said arbitration performed by said arbitration means, which of said plurality of candidate transactions to route to a destination device; wherein:
   in a processing cycle in which a new candidate transaction is received and the result of arbitration using an actual attribute value of the new candidate transaction is not yet available, said arbitration means is configured to perform said arbitration using a default attribute value as the attribute value for said new candidate transaction, and said transaction routing device is configured to store the actual attribute value associated with said new candidate transaction in an attribute storage means for storing an attribute value; and
   in a following processing cycle, if said selection means has not yet selected said new candidate transaction for routing to said destination device, then said arbitration means is configured to perform said arbitration using said actual attribute value stored in said attribute storage means as the attribute value for said new candidate transaction.

18. A method for routing transactions in an integrated circuit, each transaction having an associated attribute value defining an attribute of the transaction, said method comprising:
   an arbitration step of performing arbitration between a plurality of candidate transactions using the attribute values of said plurality of candidate transactions; and
   a selecting step of selecting, in dependence on said arbitration, which of said plurality of candidate transactions to route to a destination device; wherein:
   in a processing cycle in which a new candidate transaction is received and the result of arbitration using an actual attribute value of the new candidate transaction is not yet available, said arbitration is performed using a default attribute value as the attribute value for said new candidate transaction, and the actual attribute value associated with said new candidate transaction is stored in an attribute storage element; and
   in a following processing cycle, if said new candidate transaction has not yet been selected for routing to said destination device, then said arbitration is performed using said actual attribute value stored in said attribute storage element as the attribute value for said new candidate transaction.

* * * * *